United States Patent [19]

Baumgartl et al.

[11] Patent Number: 5,340,642
[45] Date of Patent: Aug. 23, 1994

[54] SHEETLIKE COMPOSITE

[75] Inventors: Horst Baumgartl, Mainz; Alois Schlarb, Frankenthal; Ludwig Wahl, Schifferstadt; Peter Ittemann, Mannheim; Karl-Ludwig Brentrup, Osnabrueck, all of Fed. Rep. of Germany

[73] Assignee: BASF Aktiengesellschaft, Ludwigshafen, Fed. Rep. of Germany

[21] Appl. No.: 28,034

[22] Filed: Mar. 8, 1993

[30] Foreign Application Priority Data

Mar. 7, 1992 [DE] Fed. Rep. of Germany ....... 4207244
Apr. 29, 1992 [DE] Fed. Rep. of Germany ....... 4213974

[51] Int. Cl.$^5$ ............................................... C08J 5/04
[52] U.S. Cl. ...................................... 428/224; 428/288; 428/290
[58] Field of Search ...................... 428/224, 288, 290

[56] References Cited

U.S. PATENT DOCUMENTS 4,968,555 11/1990 Landler ................................ 428/245

Primary Examiner—James C. Cannon
Attorney, Agent, or Firm—Paul L. Marshall

[57] ABSTRACT

In a sheetlike composite comprising a polyolefin matrix and natural fiber mats as reinforcement the natural fibers have a basis weight of more than 10 dtex. Sisal fibers are preferred. The composites are used in particular in automotive construction.

9 Claims, No Drawings

SHEETLIKE COMPOSITE

The present invention relates to a sheetlike composite comprising a polyolefin matrix and natural fiber mats as reinforcement.

Composites comprising a polypropylene matrix and glass fiber mats as reinforcement are known. They are increasingly used for manufacturing automotive parts. However, the possible uses of composites of this kind are limited by the comparatively high cost of the glass fiber mats. One way of reducing costs would be to use less costly fiber materials.

DE-A-1 454 988 describes the production of formed articles from thermoplastics reinforced with fibrous substances by heating the prefabricated composites to the point of plastic flow and then forming them under pressure. The fibrous substances can be present in the form of mats, and they can be organic in nature, for which case wool and cotton are mentioned as examples, However, these fibers result in composites which are low in strength and stiffness and therefore break easily, EP-A-345 463 concerns fiber-reinforced webs of thermoplastic. Natural fibers mentioned as suitable for producing the reinforcing fiber mats include for example jute fibers. It has been found that composites comprising a polyolefin matrix and jute fiber mats do indeed have an improved strength and stiffness level, but the impact toughness of the composites is too low, which can lead to brittle fracture.

WO-A-88/10286 describes a composite material produced by homogeneous incorporation of wood flour and of natural fibers, such as sisal, into a polyolefin matrix and comminution to particles. Sheets fabricated from a composite material containing such short fibers are likewise fairly low in strength and impact toughness, This also applies to composites produced according to U.S. Pat. No. 3,728,294 by coating sisal fibers 6.3 mm in length with a silicone oil, mixing with thermoplastic granules and injection molding the mixture. The silicone oil brings about a uniform dispersion of the hydrophilic fibers in the hydrophobic thermoplastic matrix.

It is an object of the present invention to make available inexpensive composites comprising a polyolefin matrix and natural fiber mat which have a comparatively high toughness, strength and stiffness.

We have found that this object is achieved by a sheetlike composite comprising a polyolefin matrix and natural fiber mats as reinforcement, wherein the natural fibers have a linear density of more than 10 tex, preferably of more than 20 tex. Composites of this kind have a favorable price/performance ratio owing to the use of comparatively inexpensive renewable raw materials. They are readily recyclable and can be burned without leaving a residue.

The preferred polyolefins are ethylene and propylene homopolymers and copolymers. Of particular suitability is polypropylene having a melt flow index MFI of from 5 to 500, in particular of from 50 to 400 [g/10 min] (at 230° C./2.16 kg), and corresponding graft copolymers, for example with acrylic acid or maleic anhydride. If the polyolefin matrix used is a mixture of 99–80% by weight of polypropylene and 1–20% by weight of a polypropylene grafted with maleic anhydride, the composites obtained have particularly high strength and stiffness. The polyolefin may contain up to 100% by weight of recyclate from recovered waste material with from 20 to 50% by weight of short natural or glass fibers, and it may also contain customary additives such as stabilizers, fillers and flame retardants.

The fiber mats used preferably comprise very coarse vegetable fibers, in particular sisal (25–35 tex), coir (50–70 tex) or banana (20–35 tex). (For comparison: jute has a fiber linear density of about 3–4 tex and cotton likewise a fiber linear density of less than 10 tex.) In addition, the fiber mats may in minor amounts also contain other fibers, for example glass, jute or flax fibers. The mats are produced in a conventional manner by the laying down of fibers or by carding. The fibers of which the mats are made should preferably have an average length of more than 10 mm, and they should particularly preferably be from 20 to 100 mm in length. Although it is not absolutely necessary to provide the fibers with a coating such as an adhesion promoter or a size, it is nevertheless advantageous for the mixture of polyolefin matrix and natural fibers to contain customary adhesion promoters, for example reactive silanes, in amounts of from 0.1 to 2% by weight. The adhesion promoter can either be drummed onto the polyolefin granules or be applied to the fibers by impregnating or spraying. In another advantageous embodiment, conventionally needled mats are used; they are bulkier and loftier than unneedled mats. The basis weight of the fiber mats can vary in wide limits within the range from 200 to 4000 [g.m$^{-2}$].

To produce the composites of the invention, the fiber mats are impregnated with molten polyolefin. For this the mixing ratios should be such that the ready-produced fiber material has a fiber content of from 20 to 70, preferably from 30 to 50, % by weight. In a preferred embodiment, a double belt press is fed simultaneously with fiber mats and polyolefin melt and presses them together under pressures of from 1 to 50 [bar]. In principle it is also possible to combine the polyolefin with the fiber mats in the form of films, powders, granules or as a solution or emulsion and to press them together at above the melt temperature batchwise or continuously, for example on a calender or on a polishing stack. The pressing has to be carried out under a sufficiently high pressure as to produce after cooling, preferably to room temperature, a compact, sheetlike semifabricate.

Polishing stacks are customary in the plastics-processing industry; their function is described for example by W. Müller and M. Dienst in "In-line-Herstellung von Platten und Folien", Kunststoffe 79 (1989), 1–9.

In contradistinction to the simpler (and less costly) polishing stacks, calenders generally offer a higher possible nip pressure. Through incorporation of peripheral control instruments, for example for inclining the rolls, they are specifically adapted to the particular requirements of the production plants with heavy-weight rolls.

This semifabricate can be cut to size and processed in a conventional manner by pressing or thermoforming at above the softening range of the thermoplastic to form shaped articles which are used for example in the automotive industry, in mechanical engineering and for domestic appliances.

EXAMPLES

1. Two needled sisal fiber mats of basis weight 800 [g.m$^{-2}$] were impregnated with polypropylene melt films having a melt flow index of 80 [g/10 min] (230° C.; 2.16 kg) and pressed in a double belt press to form a sheetlike semifabricate having a thickness of 3.8 mm and a fiber content of 40% by weight.

Trimmed panels of semifabricate were heated to 210° C. in a through-circulation oven and press molded in a positive mold in a fast-closing hydraulic press at a mold temperature of 60° C. to form the finished piece.

The finished piece was cut into test specimens on which the tensile strength and the tensile modulus of elasticity were measured in accordance with DIN EN 63 and the impact toughness in accordance with ISO 179. The results are shown in the table.

2. Example 1 was repeated with the polypropylene containing 1% by weight of a commercial adhesion promoter based on a reactive silane which had been drummed onto the polypropylene granules prior to extrusion.

TABLE

| Example | 1 | 2 |
|---|---|---|
| Tensile strength [MPa] | 35 | 53 |
| Tensile modulus of elasticity [MPa] | 3600 | 4400 |
| Impact toughness [kJ · m$^{-2}$] | 30 | 14 |

Two needled sisal mats each with a basis weight of 400 g/m$^2$ were impregnated with a polypropylene melt film having a melt flow index of 80 g/10 min (230° C.; 2.16 kg) in a polishing stack consisting of three rolls (roll width 1 m).

For this the polypropylene was first melted in a twin-screw extruder and extruded through a film die 1 m in width.

The melt film was then laid down on one of the sisal mats and covered from above with the other one. On passing through the first roll nip (thickness setting 1.9 mm) the sisal mat was impregnated with the more viscous PP melt owing to the cooling that takes place. After passing through the second nip and a conveying section of about 6 m the resulting semifabricate had cooled down to such an extent (cooling due to the ambient air) that it could be stacked. The semifabricate was mechanically rolled up onto a cardboard roller having a diameter of 20 cm.

The melt temperature at the extrusion die was 210° C., the roll temperatures of the polishing stack were in each case 60° C., and the hauloff speed was 4 m/min. The thickness of the resulting semifabricate was 2.7 mm.

We claim:

1. A sheetlike composite comprising a polyolefin matrix and very coarse vegetable fiber mats as reinforcement, wherein the very coarse vegetable fibers have a linear dinsity of more than 10 tex.

2. A sheetlike composite as claimed in claim 1, containing from 20 to 70% by weight of fiber.

3. A sheetlike composite as claimed in claim 1, wherein the fiber mats have been needled, 4. A sheetlike composite as claimed in claim 1, wherein the fibers of which the mats are made have an average length of more than 10 mm.

5. A sheetlike composite as claimed in claim 1, wherein the fiber mats are made of sisal fibers.

6. A sheetlike composite as claimed in claim 1, wherein the polyolefin is a polypropylene having a melt flow index MFI of from 5 to 500 [g/10 min] (230° C./2.16 kg).

7. A sheetlike composite as claimed in claim 1, wherein the polyolefin matrix is a mixture of 99–80% by weight of polypropylene and 1–20% by weight of a polypropylene grafted with maleic anhydride.

8. A sheetlike composite as claimed in claim 1, containing from 0.1 to 2% by weight of an adhesion promoter, for example of a reactive silane.

9. An automotive part, machine part, or household good comprising a sheetlike composite according to claim 1.

* * * * *